June 21, 1949.   V. RAWLS   2,474,013
TREAD LUG REBUILDING METHOD FOR TIRES
Filed Oct. 21, 1947   2 Sheets-Sheet 1

INVENTOR.
Vaughn Rawls
BY Owen & Owen
ATTORNEY

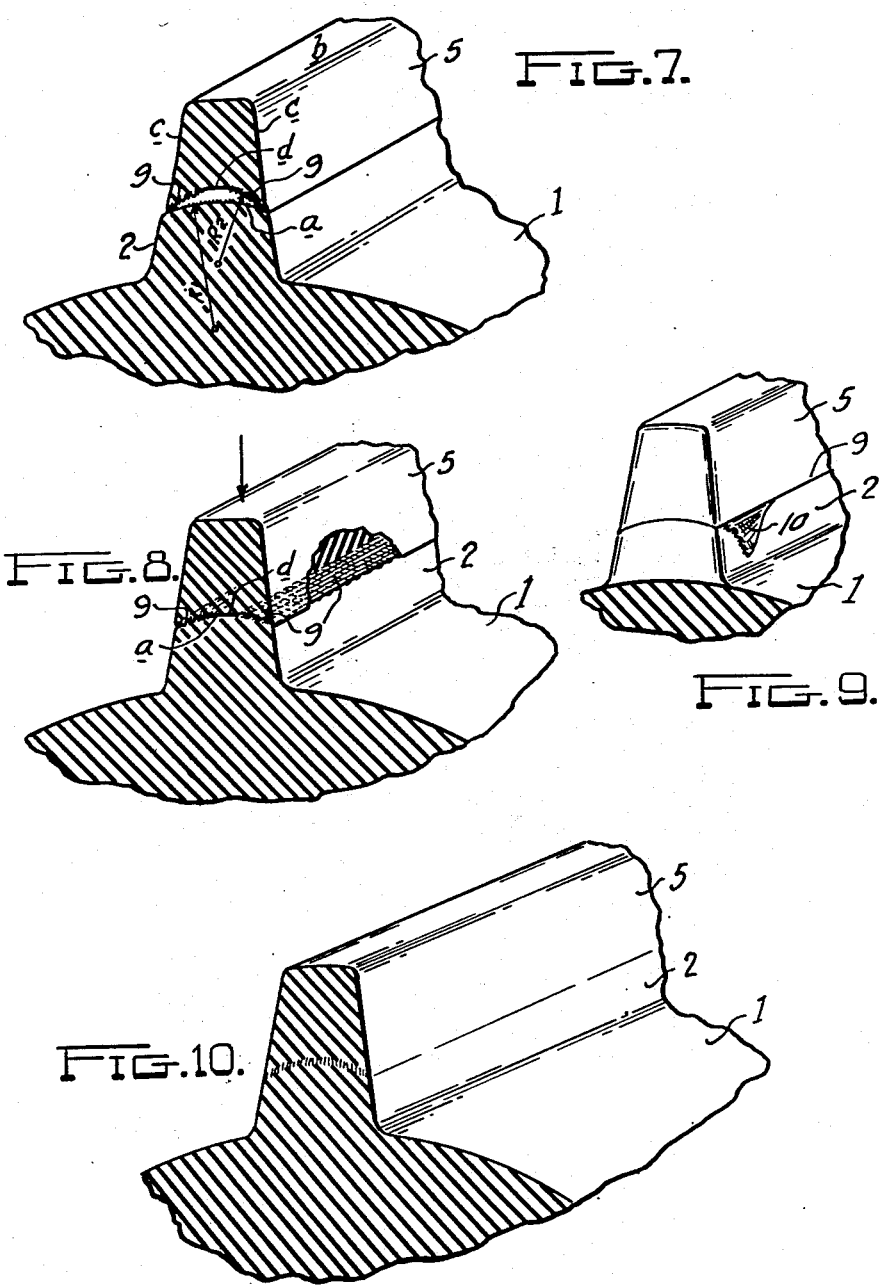

Patented June 21, 1949

2,474,013

UNITED STATES PATENT OFFICE 2,474,013

TREAD LUG REBUILDING METHOD FOR TIRES

Vaughn Rawls, Lima, Ohio, assignor to Rawls Brothers Company, Lima, Ohio, a partnership composed of Vaughn Rawls and Wesley O. Lones Application October 21, 1947, Serial No. 781,119

11 Claims. (Cl. 154—14)

This invention relates to the reconditioning particularly of heavy duty tires, such for instance as tractor tires, by replacing or rebuilding the worn tread lugs thereof to substantially their original condition.

It has heretofore been the practice, so far as I am aware, to replace the worn anti-skid surfaces of tires of this character by first buffing the tread surface smooth to remove the lugs therefrom, then building up the surface by applying so-called "camel back" strips thereto to the desired depth for the tread lugs, and then curing the tire and at the same time molding the desired anti-skid tread lugs or other configurations therein.

Attempts have also been made to rebuild worn tire lugs by flattening the lug surface and then applying a flat surfaced bar thereto. These attempts, however, have been unsuccessful for the reason that the bar could not be securely attached to the lug.

The object of the present invention is to simplify and cheapen the retreading methods now used, particularly as applied to large heavy duty tires where rather large anti-skid lugs are provided, by rebuilding the worn lugs to substantially their original form and in a manner to render them strong and durable without the necessity of building up the tread surface and then molding it to provide the lugs or other anti-skid portions therein.

Other objects and advantages of the invention will be apparent from the following detailed description, and from the accompanying drawings illustrating one embodiment of the invention, in which—

Figure 1:
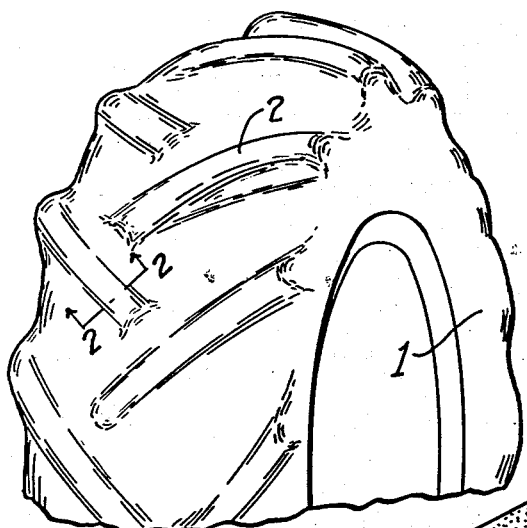
Figure 2:
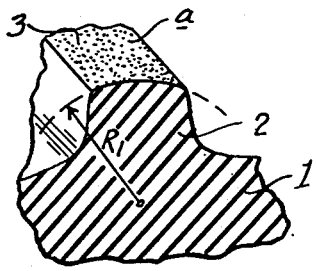
Figure 3:
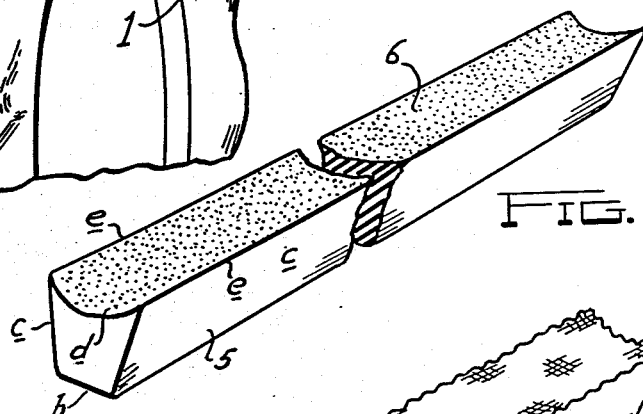
Figure 4:
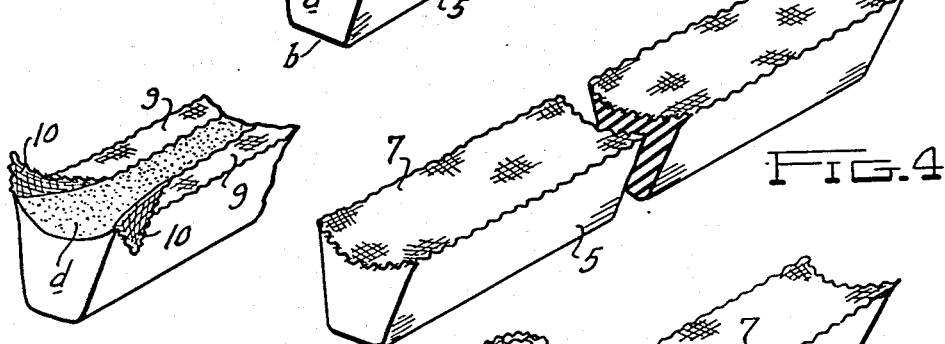
Figures 5, 6:
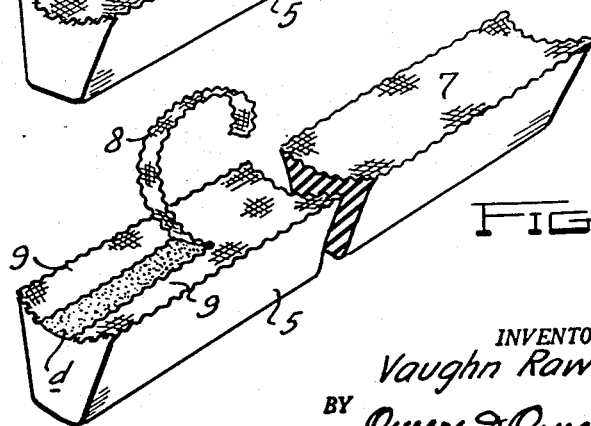

Fig. 1 is a perspective fragmentary view of a worn tire casing to which the invention applies; Fig. 2 is an enlarged cross-section of one of the tire lugs on the line 2—2 in Fig. 1; Fig. 3 is a perspective view of a building-up or replacement bar for a worn lug with a part broken away; Fig. 4 is a similar view of said replacement bar with a non-adhesive protecting sheet covering its gummed surface; Fig. 5 is a similar view showing the protecting sheet partially torn to provide an exposed central longitudinally extending portion of the gummed surface of the bar; Fig. 6 is a fragmentary view of a replacement bar with the central portion of the protecting sheet removed and with the ends of the remaining side strips thereof turned outwardly to form pull tabs; Fig. 7 is a section similar to Fig. 2 with a replacement bar and its protecting sheet, as shown in Fig. 6, initially placed on the tire lug before pressure is applied to unite the centrally exposed longitudinally extending portions of the gummed surfaces thereof, the lug and bar being in cross-section; Fig. 8 is a similar view after the application of pressure to unite the central portions of the gummed surfaces; Fig. 9 is a perspective end view of a lug with a bar applied thereto as in Fig. 8 and with an end of a protecting strip in exposed position for pulling and removal of the strip, and Fig. 10 is a section similar to Fig. 8 after the pressure curing treatment.

Referring to the drawings, $l$ designates a heavy duty tractor tire having large lugs 2 of elongated form on its tread surface with the lugs shown in a worn condition.

In preparing the tire for a rebuilding or reconditioning of the worn lugs 2, the lugs are buffed to reduce their depth substantially uniformly throughout their lengths and to transversely round their outer tread surfaces to form the transverse convex curved surface $a$, and to this surface is applied a coating of cushion gum or other suitable adhesive 3. A rebuilding bar 5 of suitable length and material is then applied to and vulcanized or strongly cemented to each lug in a simple, strong and efficient manner, as will now be described.

The bar 5 may be formed by molding or by the extrusion of material known in the rubber industry as "camel back" and which is yieldable, strong and durable and commonly used for tire retreading purposes. This bar is of desired cross-sectional shape and length to rebuild the worn and buffed tire lug, and in the present instance has a flat outer tread surface $b$, the opposed side surfaces $c$, $c$, and the inner transversely concaved surface $d$, the radius of which is preferably shorter than that of the lug surface $a$. The normal width of the surface $d$ is preferably not greater than the width of the lug surface $a$ and may be slightly less. It is thus apparent that when a bar 5 is first placed on the tire lug 2, the lip edges of the surface $d$ will alone contact the lug surface $a$ at its edges with the central portions of the two surfaces $a$ and $d$ spaced as shown in Fig. 7. Upon application of pressure to the bar 5 inwardly from its outer edge surface $b$ or radially of the tire, the inner edge lips $e$ thereof are caused to slide outwardly on the surface $a$ and the surface $d$ then assumes the shape of the surface $a$, as shown in Fig. 8. The bar surface $d$ before application to a lug is coated with a cushion gum, as shown at 6.

In order to protect the gummed surface of the bar 5 before application to a lug 2 and also to serve as a separating medium for the edge portions of the surfaces $a$ and $d$, when a bar is initially applied to a lug, the gummed bar surface $d$ is covered with a thin sheet material 7 preferably of glazed fabric similar to tracing linen. A fabric commonly used in the tire tread and suitable for the purpose is known as "Holland cloth."

Prior to applying a bar 5 to a buffed lug 2, the material 7 is torn lengthwise to remove a center strip 8, as shown in Fig. 5, thus leaving two transversely spaced edge strips 9, 9, so that when the bar is applied to a lug the central longitudinal portions of the gummed surfaces $a$ and $d$ will be permitted to engage and adhere one to another while the side edge portions of such surfaces will be spaced and prevented from adhering by the strips 9, 9. Pressure is applied to the outer surface $b$ of the bar 5 in any suitable manner, as by tapping with a hammer, so as to force the exposed portions of the gummed surfaces $a$ and $d$ into close engagement, and this pressure causes a spreading of the side portions of the bar surface $d$ covered by the strips 9, 9, and a consequent conformance of the curved surface $d$ to the curved surface $a$. This spreading action is permitted by reason of the interposed strips 9, 9, which prevent adherence one to the other of the opposing gummed surface portions. The width of the exposed central engaging portions of the gummed surfaces $a$ and $d$ is sufficient to retain the bar 5 in quite firm adherence until the strips 9, 9 have been subsequently removed and the curing pressure applied.

Before applying a bar 5 to a lug 2, an end of each strip 9 is turned out over the strip as shown at 10 in Fig. 6, so as to provide a lateral projecting tab or finger grip when a bar and a lug are assembled one on another, as shown in Fig. 9.

The next step in the operation is to grasp the turned-out end 10 of each strip 9 and draw it from between the coacting clamping surfaces $a$ and $d$ with a pull that is preferably slightly inward toward the tire casing. This not only permits the opposing gummed side portions of the surfaces $a$ and $d$ to be engaged progressively outward from the central engaged portion due to the cushion and elastic action of the inner edge portions of the bar 5, but also causes any air trapped therebetween to be excluded as the strips are pulled out, thus insuring a continuous adherence of the two parts from edge to edge of their engaging surfaces and avoiding the presence of objectionable air bubbles therebetween.

When the bars 5 have been applied to all of the lugs of a tire, the tire is subjected to a pressure curing treatment to effect a firm vulcanizing of the bars on the lugs. This treatment is preferably effected by the application of steam pressure to the tire in a closed chamber. It is found in practice that a tire lug built up or replaced in the manner described produces a lug that is practically as strong and will withstand as much hard usage as a lug in its original molded form. It is also found that the renewing of a worn tire tread by this method is not only as efficient as the methods heretofore used, but is very materially cheaper and quicker.

I wish it understood that my method is not restricted to the various steps and structural arrangement of the parts as herein described, but is capable of numerous modifications and changes without departing from the spirit of the claims.

Having thus described my invention, what I claim as new and desire to secure by United States Letters Patent is:

1. The method of rebuilding a worn tread lug of a rubber tire, which comprises buffing the lug to provide it from end to end with a transverse convex curved surface, applying to said surface lengthwise of the lug a bar of rubber-like material having its inner surface substantially the width of said lug surface and transversely curved in concave form with its curve of shorter radius than that of the lug curve, the curved surfaces of the lug and bar being coated with an adhesive material, one of said surfaces having a strip of sheet-like non-adhesive material over each side edge portion to provide the adhesive surface with an exposed longitudinally extending central portion, applying inward pressure to the bar to cause adherence of said surfaces between said strips, withdrawing the strips from between said surfaces to permit adherence of the surfaces separated thereby, and subjecting the rebuilt lug to a curing treatment.

2. The method of rebuilding a worn tread lug of a rubber tire, which comprises forming the lug from end to end with a smooth outer edge surface, applying to said surface lengthwise of the lug a bar of rubber-like material having its inner surface substantially the width of said lug surface and adapted to seat thereon, said surfaces of the lug and bar being coated with an adhesive material to cause an adherence of one to the other, one of said surfaces having a strip of sheet-like non-adhesive material over each side edge portion thereof to provide the adhesive surface with an exposed longitudinally extending central portion, applying inward pressure to the bar to cause adherence of said exposed surfaces between said strips, withdrawing the strips from between said surfaces to permit complete adherence thereof, and subjecting the rebuilt lug to a curing treatment.

3. The method of rebuilding a worn tread lug of a rubber tire, which comprises forming the lug from end to end with a transverse convexly curved outer edge surface, applying to said surface lengthwise of the lug a bar of rubber-like material having its inner surface substantially the width of said lug surface and transversely curved in concave form to receive said convex lug surface, the curved surfaces of said lug and bar being coated with an adhesive material, one of said surfaces having a strip of sheet-like non-adhesive material over each side edge portion to provide the adhesive surface with an exposed longitudinally extending central portion, applying pressure to the bar to cause adherence of said exposed surfaces between said strips, withdrawing the strips from between said surfaces to permit complete adherence thereof, and subjecting the rebuilt lug to a curing treatment.

4. The method of rebuilding the worn tread lugs of rubber tires, which comprises buffing the worn lugs to provide each from end to end with a smooth outer edge surface, applying to said surface lengthwise of the lug a bar of rubber-like material having its inner surface substantially conforming to that of the buffed surface of the lug to be pressed into engagement therewith from edge to edge thereof, each of said engaging surfaces being coated with an adhesive material disposing a protecting strip of non-adhesive sheet material between said surfaces along the edge portions thereof to provide exposed portions for coaction one with the other along the longitudinal central portions of said surfaces, applying an inward pressure to the bar to cause a firm adhesion of said exposed surfaces, then withdrawing the strips from between said surfaces by applying a progressive pull to each strip from end to end thereof, and subjecting the tire to a pressure curing treatment.

5. The method of rebuilding the worn tread lugs of rubber tires, which comprises forming the lug surface from end to end with a transverse convexly curved outer edge surface, applying to said surface lengthwise of the lug a bar of rubber-like material having its inner coacting surface transversely curved in concave form, the curved surfaces of said lug and bar being coated with an adhesive material, one of said surfaces having a strip of sheet-like non-adhesive material over each side edge portion to space and prevent adherence of the corresponding opposed adhesive surfaces and to permit adherence of the surfaces between said strips, applying inward pressure to the bar to cause firm adherence of the central contacting portions of said surfaces, withdrawing said strips from between said surfaces by applying a progressive pull to each strip from one end to the other thereof to permit adhesive engagement of the surfaces separated thereby, each strip turning outwardly over itself during such removal, and then subjecting the tire to a curing treatment with inward pressure applied to the built-up lugs.

6. A method as called for in claim 5 wherein the curve of the lug has a longer radius than that of the bar.

7. A method as called for in claim 5 wherein the protecting strip is applied to the adhesive surface of the bar and has its central longitudinally extending portion removed preparatory to applying the bar to the lug so as to form said side edge strips.

8. The method of rebuilding the worn tread lugs of rubber tires, which comprises forming each lug with a uniform outer edge surface, applying adhesive material thereto, providing a bar of rubber-like material for positioning on and building out said lug, said bar having its inner surface coated with an adhesive material, applying said bar to said lug by pressure with a central longitudinally extending portion only of said adhesive surfaces initially engaged, subsequently causing adhesive engagement of the remaining portions of said surfaces, and then subjecting the tire to a curing treatment.

9. A method as called for in claim 8 wherein the adhesive surfaces of the lug and bar are transversely curved for one to fit over the other.

10. A method as called for in claim 9 wherein the curve of the lug has a longer radius than that of the bar.

11. A method as called for in claim 8 wherein the tire is cured in a closed chamber by steam pressure.

VAUGHN RAWLS.

REFERENCES CITED

The following references are of record in the file of this patent:

UNITED STATES PATENTS

| Number | Name | Date |
| --- | --- | --- |
| 1,409,418 | Shawger | Mar. 14, 1922 |
| 1,920,720 | Thurman et al. | Aug. 1, 1933 |
| 2,009,524 | Schmidt | July 30, 1935 |
| 2,180,650 | White | Nov. 21, 1939 |
| 2,232,001 | Hawkinson | Feb. 18, 1941 |
| 2,290,624 | Wait et al. | July 21, 1942 |